United States Patent [19]

Miyamoto

[11] Patent Number: 4,733,854
[45] Date of Patent: Mar. 29, 1988

[54] FLUID SEALED MOUNTING

[75] Inventor: Yasuo Miyamoto, Saitama, Japan

[73] Assignee: Honda Giken Kogyo Kabushiki Kaisha, Tokyo, Japan

[21] Appl. No.: 881,563

[22] Filed: Jul. 3, 1986

Related U.S. Application Data

[63] Continuation of Ser. No. 619,239, Jun. 11, 1984, abandoned.

[30] Foreign Application Priority Data

Jun. 10, 1983 [JP] Japan ............................... 58-104737
Jun. 10, 1983 [JP] Japan ............................... 58-104738
Jan. 19, 1984 [JP] Japan ............................... 59-5997[U]

[51] Int. Cl.$^4$ ............................................. F16F 9/04
[52] U.S. Cl. ................................................. 267/140.1
[58] Field of Search ............... 267/140, 140.1, 140.2, 267/140.3, 140.4, 140.5, 141, 141.2, 141.3, 141.4, 141.5, 141.6, 141.17, 8 R, 35, 63 R, 33, 152, 153; 188/298, 379, 317; 248/636, 562

[56] References Cited

U.S. PATENT DOCUMENTS

| | | | |
|---|---|---|---|
| 2,380,899 | 7/1945 | Strachovsky | 267/140.1 |
| 2,387,065 | 10/1945 | Hardiny | 188/298 |
| 2,524,405 | 10/1950 | Storrs | 267/140.1 |
| 4,064,977 | 12/1977 | Taylor | 188/317 |
| 4,159,091 | 6/1979 | LeSalver et al. | 267/140.1 |
| 4,199,128 | 4/1980 | Boom et al. | 267/140.1 |
| 4,392,639 | 7/1983 | Konishi | 267/140.1 |
| 4,458,888 | 7/1984 | Wolf et al. | 267/140.1 |

FOREIGN PATENT DOCUMENTS

| | | | |
|---|---|---|---|
| 2906282 | 8/1980 | Fed. Rep. of Germany | 267/140.1 |
| 56-153133 | 11/1981 | Japan | |
| 0048201 | 10/1982 | Japan | 267/140.1 |
| 2068079 | 8/1981 | United Kingdom | 267/140.1 |

Primary Examiner—John W. Caldwell, Sr.
Assistant Examiner—Alvin Oberley
Attorney, Agent, or Firm—Armstrong, Nikaido, Marmelstein & Kubovcik

[57] ABSTRACT

A fluid-sealed mounting comprises a base adapted to be secured to a vehicle body frame, for example, an attachment adapted to be connected to a source of vibrations, a first elastic member connected to the base and the attachment, a fluid chamber defined at least partly by the base, the attachment, and the first elastic member, and filled with a fluid, a partition dividing the fluid chamber into first and second chambers, and an orifice providing communication between the first and second chambers. The partition comprises a second elastic member connected to the base and the attachment. The rate of flow of the fluid through the orifice between the first and second chambers at the time the first elastic member is vibrated is different from the rate of flow of the fluid through the orifice between the first and second chambers at the time the second elastic member is vibrated.

17 Claims, 33 Drawing Figures

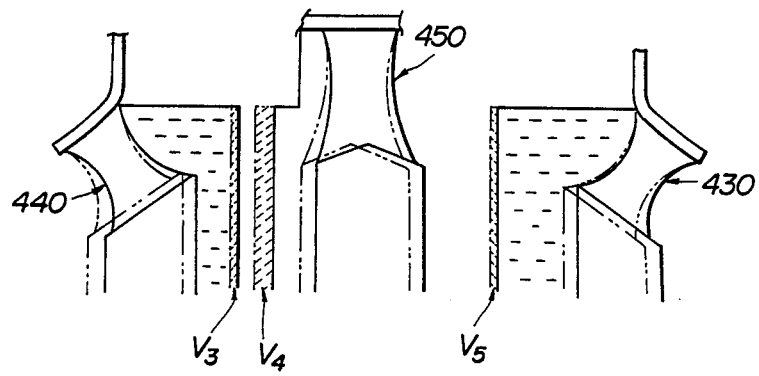
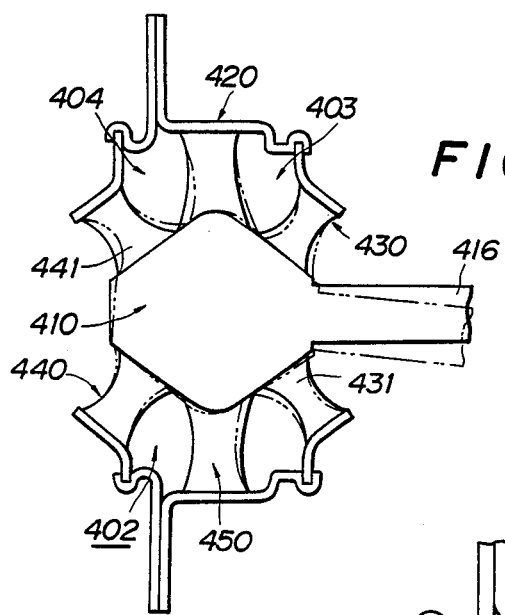
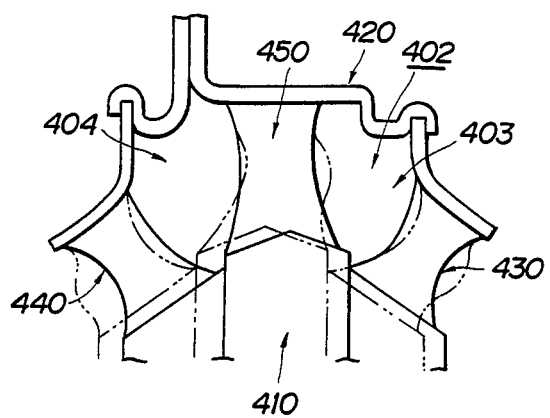

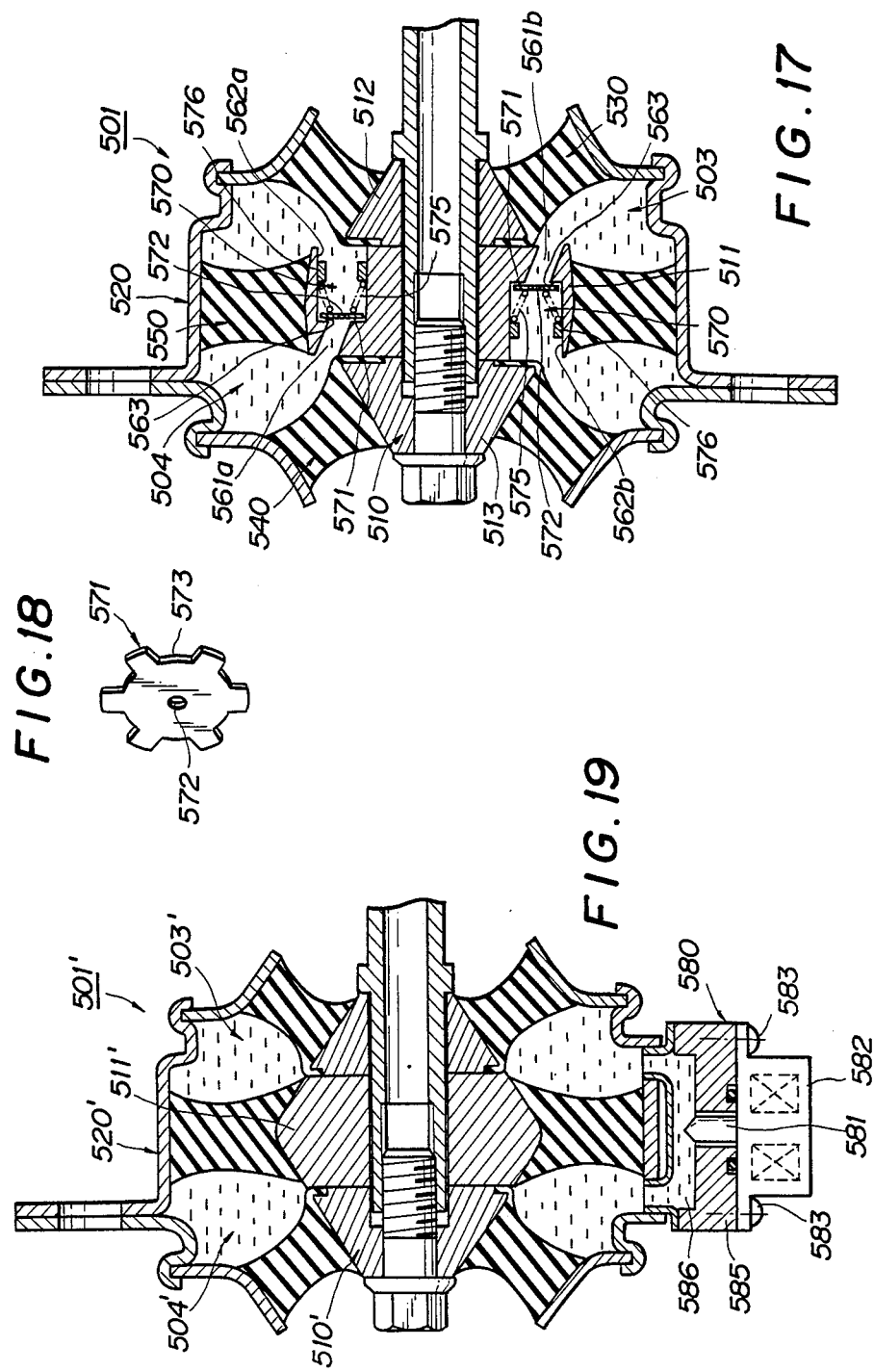

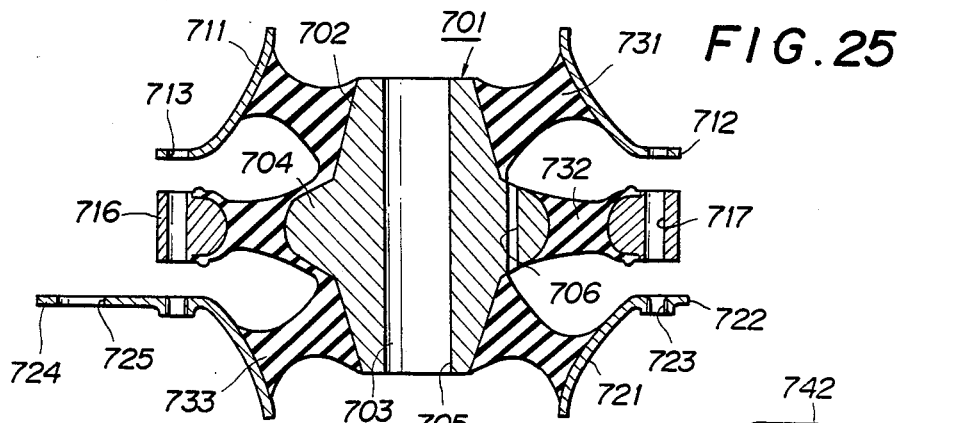
FIG. 25
FIG. 26
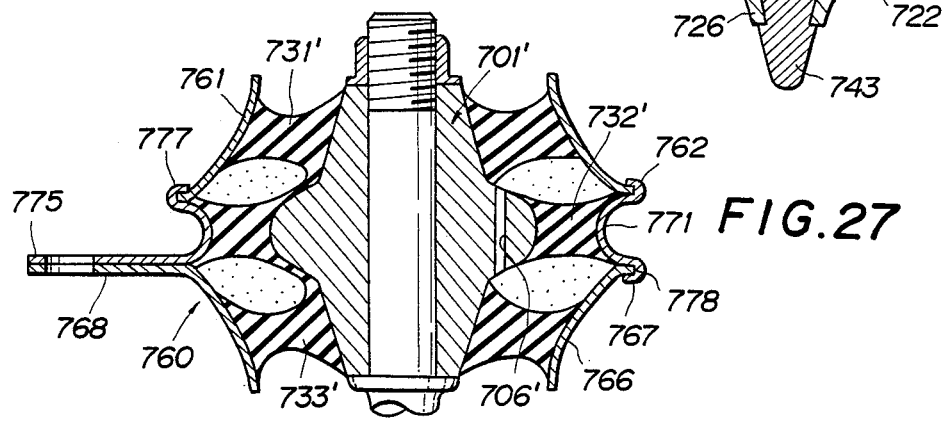
FIG. 27
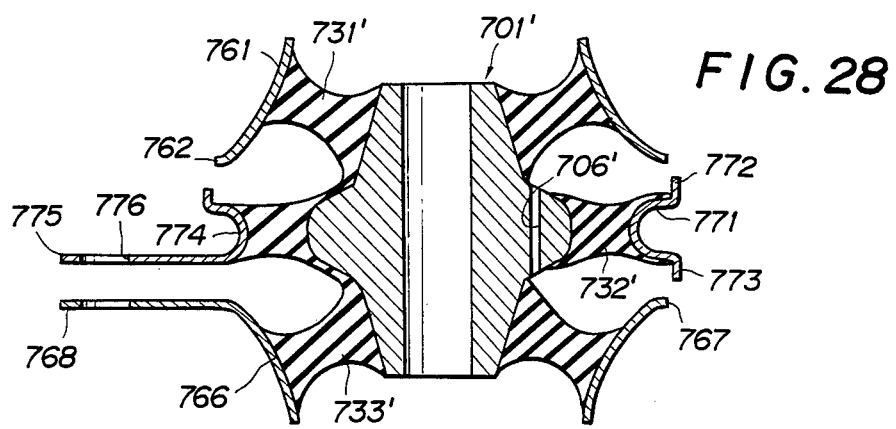
FIG. 28

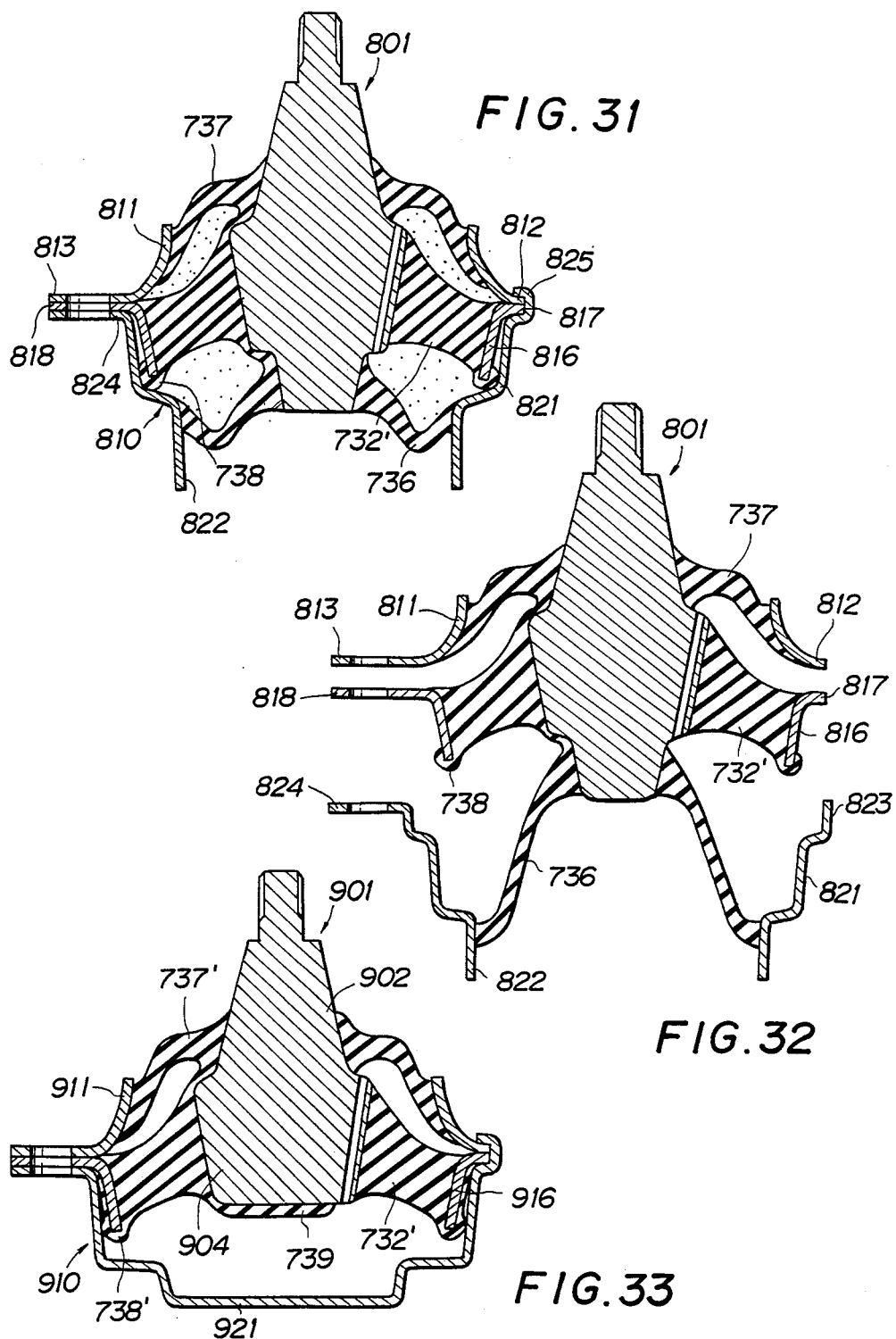

FLUID SEALED MOUNTING

This application is a continuation of application Ser. No. 619,239 filed June 11, 1984, abandoned.

BACKGROUND OF THE INVENTION

1. Field of the Invention:

The present invention relates to a fluid-sealed mounting having therein a chamber in which a fluid is sealed, and more particularly to the structure of a fluid-sealed mounting for connecting an engine or a torque rod or radius rod in a wheel suspension to a vehicle body frame.

2. Description of the Prior Art:

One known type of fluid-sealed mounting such as an engine mounting comprises a base adapted to be connected to a vehicle body frame, an attachment adapted to be connected to a source of vibrations such as an an engine, a shearing elastic member of rubber joined between the base and the attachment, and a diaphragm attached to the base. The base, the attachment, the elastic member, and the diaphragm jointly define a fluid chamber in which there is transversely disposed a partition having an orifice and mounted on the base. A fluid is sealed in chambers divided by the partition. Such a mounting is disclosed in Japanese Laid-Open Patent Publication No. 56-153133.

Generally, it is known that a fluid-sealed mounting used as an engine mounting can produce an ideal damping force when an energy loss coefficient (tan $\oplus$) is about 0.3 at a vibration frequency in the range of from 10 to 15 Hz. If the energy loss coefficient tan were smaller than 0.3, the mounting would have a small vibroisolating effect on vehicle vibrations. If the energy loss efficiency is greater than 0.3, a dynamic spring constant would become higher, and the vibroisolating capability for isolating secondary vibrations and the like would be reduced.

With the above known fluid-sealed mounting, the rate of flow of the fluid passing through the orifice in the partition between the two chambers is large, resulting in an energy loss coefficient tan $\delta$ ranging from 0.4 to 0.6. The value of tan $\delta$ at the vibration frequency of 15 Hz is 0.52 rather than the desired value of 0.3. The conventional fluid-sealed mounting is also disadvantageous in that when the attachement is subjected to an abrupt tensile load, the fluid pressure in the fluid chamber composed of the two chambers connected through the orifice is lowered since the rate of the fluid flowing through the orifice is high, and hence cavitation is generated in the orifice, thus failing to produce sufficient damping forces. As a consequence, the prior fluid-sealed mounting is not suitable for use as a mounting for a torque rod or a radius rod used in wheel suspensions.

SUMMARY OF THE INVENTION

It is therefore a first object of the present invention to produce a fluid-sealed mounting in which the rate of flow of a fluid flowing through an orifice interconnecting two chambers in the mounting is smaller than the conventional rate to provide an energy loss coefficient closer to an ideal value so that proper damping forces will be generated.

A second object of the present invention is to provide a fluid-sealed mounting in which the rate of flow of a fluid flowing through an orifice interconnecting two chambers in the mounting is smaller than the conventional rate to transfer the fluid forcibly through the orifice when the mounting is subjected to an abrupt tensile load, thereby suppressing cavitation and generating sufficient damping forces in the directions of both compression and tension, so that the fluid-sealed mounting will be suitable for use an an engine mounting and a mounting for a torque rod and a radius rod.

Another object of the present invention is to provide a fluid-sealed mounting which will achieve the above first and second objects and which is capable of changing the cross-sectional area of an orifice for controlling the rate of flow of the fluid therethrough so that when the mounting is subject to an impact load, the rate of fluid flow through the orifice will be increased for producing sufficient damping forces.

Still another object of the present invention is to provide a fluid-sealed mounting which will achieve the above first and second objects and which, when subjected to a load greater than a certain level, will increase the spring constant and simultaneously increase the rate of flow of the fluid passing through an orifice, independently of the cross-sectional area of the orifice, so that increased damping foces will be generated to suppress deformation of the mounting.

A still further object of the present invention is to provide a fluid-sealed mounting which will achieve the second object and which has softer spring resiliency in the directions of bending and twisting of the central axis thereof, so that the mounting will be suitable for use as a torque rod mounting and a radius rod mounting.

A yet further object of the present invention is to provide a fluid-sealed mounting which is of a simple construction and hence of a low cost.

According to the present invention, there is provided a fluid-sealed mounting comprising a base, an attachment adapted to be connected to a source of vibrations, a first elastic member connected to the base and the attachment, a fluid chamber defined at least partly by the base, the attachment, and the first elastic member, and filled with a fluid, a partition dividing the fluid chamber into first and second chambers, and an orifice providing communication between the first and second chambers, the partition comprising a second elastic member connected to the base and the attachment, the arrangement being such that the rate of flow of the fluid through the orifice between the first and second chambers at the time the first elastic member is vibrated is different from the rate of flow of the fluid through the orifice between the first and second chambers at the time the second elastic member is vibrated. The fluid-sealed mounting also includes a diaphragm cooperating with the base, the attachment, and the first elastic member in defining the fluid chamber and having an outer peripheral edge substantially supported by the attachment, or a third elastic member cooperating with the base, the attachment, and the first elastic member in defining the fluid chamber and vibratable to cause the fluid to pass through the orifice between the first and second chambers at a rate which is substantially the same as the rate of fluid flow at the time the first elastic member is vibrated. A valve mechanism for controlling the rate of fluid flow may be disposed in the orifice. At least one of the base and the attachment may be provided with a stopper which will be pressed against at least one of the first, second, and third elastic members to supress the movement of the elastic member to thereby increase the rate of fluid flow, when the attachment is displaced beyond a certain extent. The first and third elastic members may be coupled to the attachment at surfaces inclined with respect to the central line of the mounting. The attachment may be composed of an integral component extending through the fluid chamber, and the base may be composed of at least two separated components fastened together. The first, second, and third elastic members may be connected by joint portions along the surface of the attachment.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 11 is a diagram illustrative of the manner in which the fluid-sealed mounting of FIG. 10 operates;

FIG. 13 is a diagram illustrative of the manner in which the fluid-sealed mounting of FIG. 10 operates;

FIG. 14 is a diagram illustrative of a problem with the fluid-sealed mounting of FIG. 10;

FIG. 17 is an axial cross-sectional view of a fluid-sealed mounting according to a fifth embodiment of the present invention;

FIG. 18 is a perspective view of a circular valve in the fluid-sealed mounting shown in FIG. 17;

FIG. 19 is is a view similar to FIG. 17, showing a modification of the fifth embodiment;

FIG. 25 is a view similar to FIG. 23, showing the mounting prior to being attached to a source of vibrations and a vehicle body frame;

FIG. 26 is a fragmentary enlarged cross-sectional view of a base assembled by a pin;

FIGS. 27 and 28 are views similar to FIGS. 23 and 25, illustrating a modification of the seventh embodiment;

FIGS. 31 and 32 are views similar to FIGS. 23 and 25, showing still aother modification; and FIG. 33 is a view similar to FIG. 23, showing a still further modification.

DESCRIPTION OF THE PREFERRED EMBODIMENTS

Figure 1:
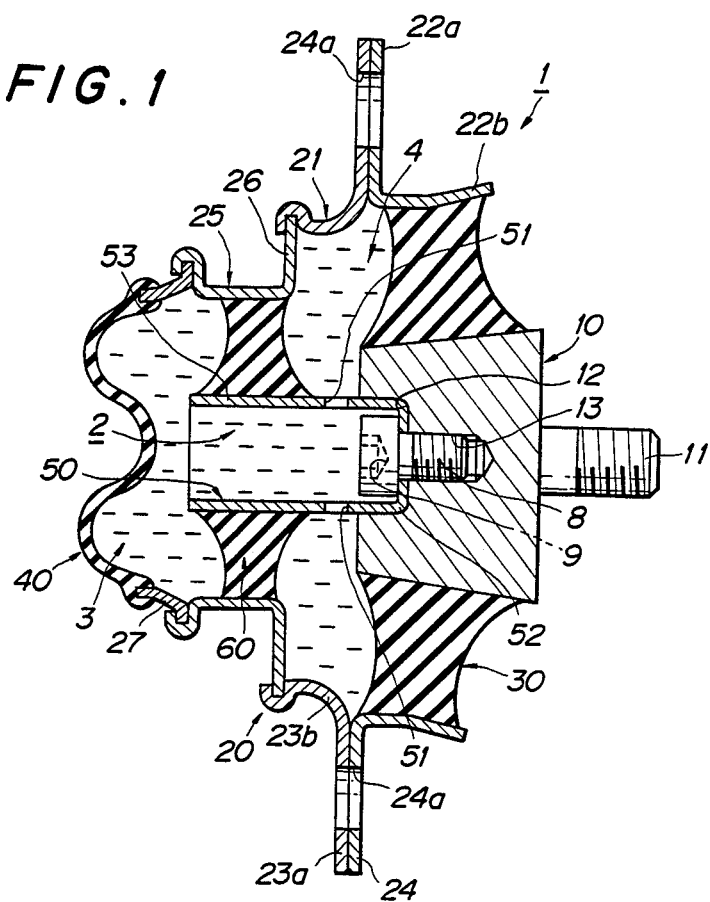
FIG. 1 is an axial cross-sectional view of a fluid-sealed mounting according to a first embodiment of the present invention.

As shown in FIG. 1, a fluid-sealed mounting 1 generally comprises a frustoconical attachment 10 for being connected to a source of vibrations such as an engine, a stepped cylindrical base 20 for being secured to a fixed member such as a vehicle body frame and having a larger-diameter cylindrical portion 21, and a shearing elastic member 30 of rubber having a relatively large area and joining the attachment 10 and the larger-diameter cylindrical portion 21. The base 20 includes a smaller-diameter cylindrical portion 25 with a diaphragm 40 attached to an end thereof, defining a fluid chamber 2 in the base 20. An orifice-defining member 50 is of a cup-shaped configuration having a plurality of radial orifices 51 defined in a peripheral wall thereof near a bottom 52 thereof, which is secured to the end surface of the attachment 10 which faces the fluid chamber 2. The orifice-defining member 50 has a peripheral wall 53 near an open end thereof and joined to the smaller-diameter cylindrical portion 25 of the base 20 by a shearing elastic member 60 of rubber having a relatively small area different from the area of the elastic member 30. The fluid chamber 2 is divided by the elastic member 60 into two chambers 3, 4 communicating with each other through the orifices 51.

In the embodiment of FIG. 1, the fluid-sealed mounting 1 has a horizontal axis. The larger-diameter cylindrical portion 21 of the base 20 is composed of members 22, 23, the member 22 including a flaring cylindrical portion 22b extending to the right (as shown) from an inner peripheral edge of a radial annular plate 22a. The other base member 23 has a cylindrical portion 23b extending to the left (as shown) from an inner peripheral edge of a radial annular plate 23a. The annular plates 22a, 23a are placed one on the other and fixed to each other as by welding. The smaller-diameter cylindrical portion 25 includes an annular plate 26 extending from one end thereof radially outwardly and secured to an open end of the cylindrical portion 23b as by staking or welding. The smaller-diameter cylindrical portion 25 has an opposite end to which an end of a diaphragm attachment member 27 is secured as by staking or welding. The annular plates 22a, 23a fastened together serve as an attachment flange 24 for attachment to a fixed member, the attachment flange 24 having attachment screw holes 24a defined therein.

The attachment 10 is of a frustoconical configuration smaller in diameter than the base 20 and has an attachment screw 11 projecting from a larger-area end thereof for connection to the source of vibrations. The smaller-area end of the attachment 10 has a circular hole 12 defined centrally therein and a screw hole 13 positioned centrally therein in concentric relation.

The elastic member 30 comprises a large-diameter, thick annular body having an outer peripheral surface secured by burning to an inner peripheral surface of the flaring cylindrical portion 22b of the larger-diameter cylindrical portion 21 of the base 20. The frustoconical attachment 10 has an outer peripheral surface secured by burning to an inner peripheral surface of the resilient member 30 with the attachment screw 11 projecting outwardly.

The bottom 52 of the cup-shaped orifice-defining member 50 is fitted in the circular hole 12 in the attachment 10. A bolt 8 having a head with a hexagonal socket 9 is threaded from the bottom 52 into a threaded hole 13 in the attachment 10, thereby securing the orifice-defining member 50 to the attachment 10.

The elastic member 60 comprises a small-diameter, thick annular body different from the elastic member 30 and having an outer peripheral surface secured by burning to an inner peripheral surface of the smaller-diameter cylindrical portion 25 of the base 20. The peripheral wall 53 of the orifice-defining member 50 has an outer peripheral surface secured by burning to an inner peripheral surface of the elastic member 60.

The diaphragm 40 has a peripheral edge fitted in and secured by burning to the end of the diaphragm attachment member 27 fixed to the smaller-diameter cylindrical portion 25, thereby securing the diaphragm 40 to the base 20.

The fluid-sealing mounting 1 is thus constructed with the attachment 10 held in concentric relation to the base 20.

A fluid (a liquid in the illustrated embodiment) is sealed in the fluid chamber which is divided by the elastic member 60 into the two chambers 3, 4 held in communication with each other by the orifices 51. The diaphragm 40 in its free state is flexed as shown.

Figure 2:
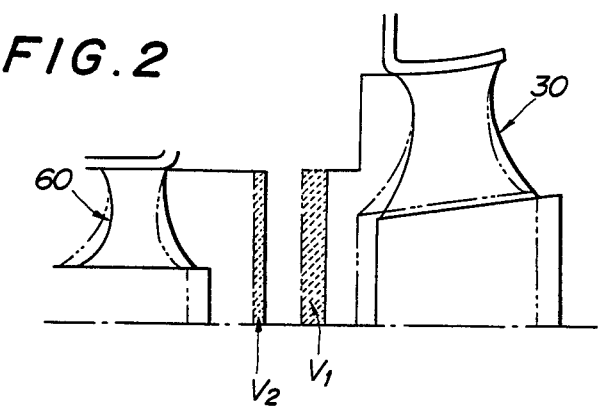
FIG. 2 is a diagram illustrative of the manner in which the fluid-sealed mounting of FIG. 1 operates.

The fluid chamber 2 is divided into the chambers 3, 4 by the elastic member 60 smaller in diameter or crossectional area than the elastic member 30 which provides an end wall of the fluid chamber 2 defined by the base 20 and the attachment 10 which are joined together, the elastic member 60 coupling the orifice-defining member 50 secured to the attachment 10 in the fluid chamber 2 and the inner peripheral surface of the base 20. The elastic members 30, 60 will be displaced to the same extent at their inner peripheral surfaces. When the mounting is subjected to a vibratory load, the fluid flows from one chamber 4 to the other chamber 3 at a rate $(V_1-V_2)$ which is the difference between the rate $V_1$ of fluid flow at the time the elastic member 30 is vibrated and the rate $V_2$ of fluid flow at the time the elastic member 60 is vibrated. Such an operation is illustrated in FIG. 2.

With the first embodiment of the present invention, the rate of fluid flow is lower than the rate $V_1$ of fluid flow in the conventional fluid-sealed mounting by the rate $V_2$ of fluid flow caused when the elastic member 60 dividing the fluid chamber 2 into the two chambers 3, 4. Therefore, the damping force is lowered to make the energy loss coefficient close to an ideal value of 0.3.

Figure 3:
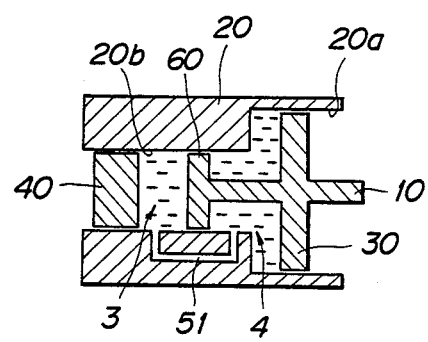
FIG. 3 is a cross-sectional view of a model of the fluid-sealed mountin of FIG. 1.

FIG. 3 shows a structural model of the fluid-sealed mounting 1 according to the first embodiment. The base 20 serves as a cylinder having two different inside diameters. The elastic member 30 serves as a piston on an intermediate portion of the attachment 10 serving as a piston rod, the elastic member 30 being disposed slidably in a largerdiameter sleeve 20a of the cylinder 20. The elastic member 60 serves as another piston mounted on a distal end of the attachment 10 and slidably disposed in a smaller-diameter sleeve 20b of the cylinder 20. The two chambers 3, 4 divided by the piston 60 are held in mutual communication by the orifice 51. The rate of fluid flow through the orifice is controlled by the pistons 30, 60. The diaphragm 40 serves as a free piston slidable in the smaller-diameter sleeve 20b. As can be understood from FIG. 3, the orifice 51 may be defined in the base 20.

Figure 4:
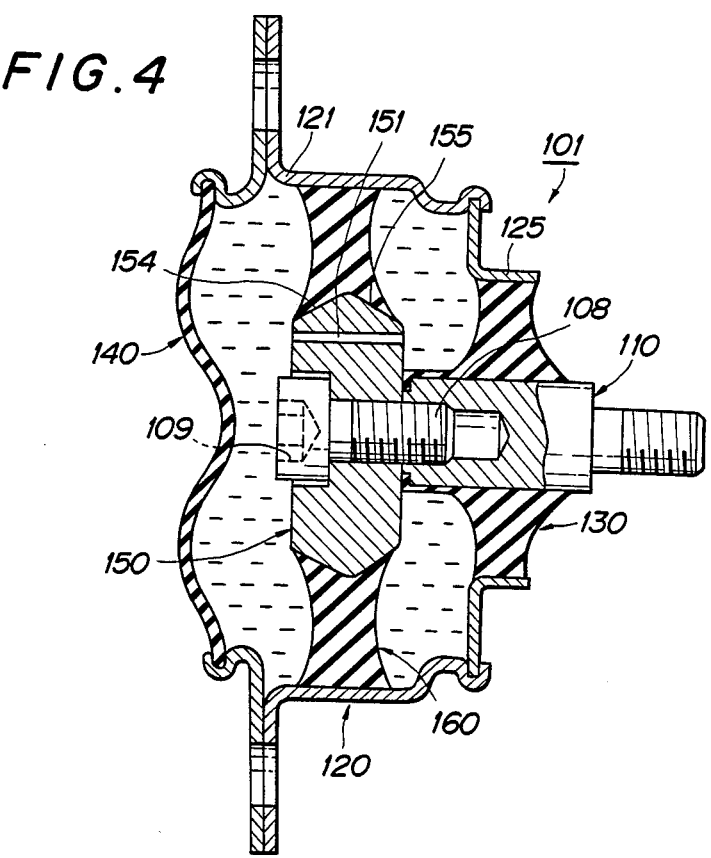
FIG. 4 is a view similar to FIG. 1, showing a modification of the first embodiment.

FIG. 4 shows a modification of the first embodiment. A modified mounting 101 has an attachment 110 comprising a cylindrical body and a stepped cylindrical base 120 including a larger-diameter cylindrical portion 121 to which a diaphragm 140 is attached. The cylindrical attachment 110 is coupled to a smaller-diameter cylindrical portion 125 of the base member 120 by a smaller-diameter annular elastic member 130. A thick circular weight 150 having two opposite tapered portions 154, 155 is secured to an end surface of the attachment 110 by a bolt 108 having a head with a hexagonal socket 109. The weight 150 has an outer peripheral surface coupled to the larger-diameter cylindrical portion 121 of the base 120 by a largerdiameter annular elastic member 160. The modified mounting shown in FIG. 4 has the same advantages as those described above with reference to the first embodiment. The weight 150 has an orifice defined therethrough parallel to the central axis for the mounting 101. Thus, the weight 150 doubles as an orifice-defining member. The head of the bolt 108 is substantially embedded in the weight 150.

Where a torque rod or a radius rod is to be connected to the attachment, it is desirable that the elastic member outside of the fluid chamber be softly deformable in following a load tending to bend or twist the rod.

Figure 5:
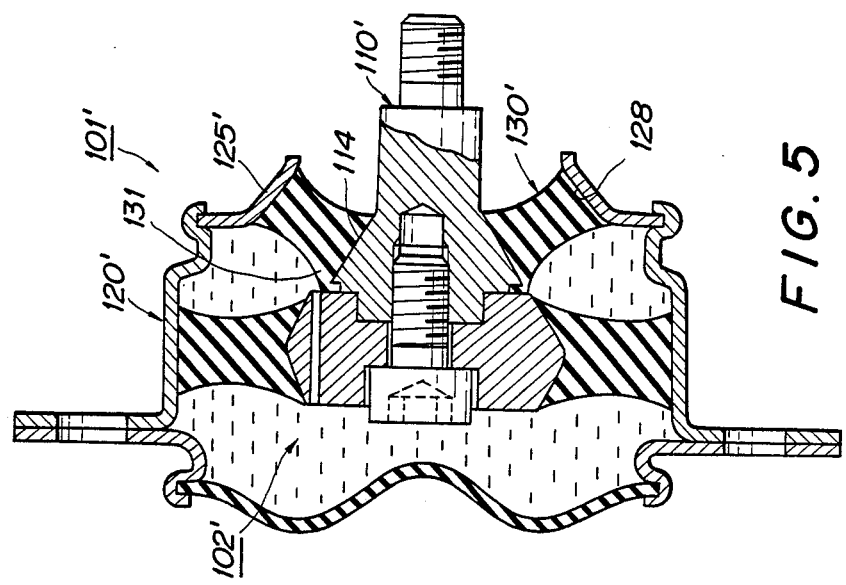
FIG. 5 is a view similar to FIG. 1, showing another modification of the first embodiment.

According to another modification shown in FIG. 5, a fluid-sealed mounting 101' comprises a base 120' including a smaller-diameter cylindrical portion 125' having an open end slanted radially inwardly and axially outwardly to provide a tapered portion 128. An attachment 110' has an end including an outer periphery shaped as a tapered portion 114 parallel to the tapered portion 128. The tapered portions 128, 114 are coupled by an umbrellashaped elastic member 130' having an inner periphery 131 inclined into a fluid chamber 102'. The other construction of FIG. 5 is the same as that of the modified mounting shown in FIG. 4.

With the mounting 101' of FIG. 5, the outer elastic member 130' has an umbrella shape with its inner periphery projecting into the fluid chamber 102'. Therefore, the outer elastic member 130' is more flexible in directions to bend and twist the attachment member 110' to allow the latter to be bent and twisted to a greater extent. The mounting 101' is accordingly suitable for use as a torque rod mounting and a radius rod mounting.

Figure 6:
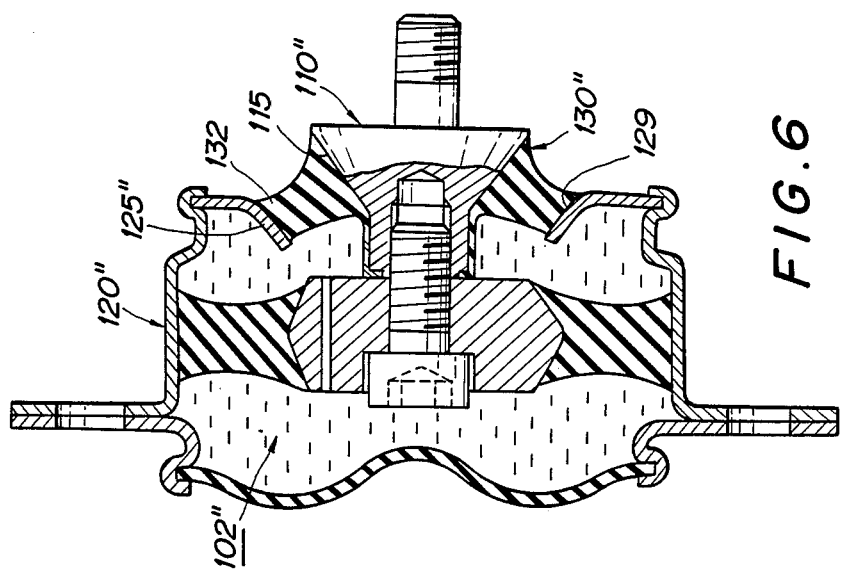
FIG. 6 is a view similar to FIG. 1, showing still another modification of the first embodiment.

FIG. 6 also shows still another modification in which a smaller-cylindrical portion 125" of a base 120" is slanted radially inwardly and axially inwardly as a flaring portion 129. An attachment 110" has an end having an outer periphery shaped as a flaring portion 115 parallel to the flaring portion 129. The flaring portions 129, 115 are coupled by an umbrella-shaped elastic member 130" having an outer periphery 132 inclined toward a fluid chamber 102". The elastic member 130" allows the attachment 110" to move in its bending and twisting directions, and has its spring resiliency harder at its outer periphery as the compressive load increases. The inner resilient member may be of a different shape.

A second embodiment of the present invention will be described.

When the attachment is subjected to an impact load, resistance to passage of the fluid through the orifice increased, and the rate at which the resilient member forming an end wall of the fluid chamber and the inner resilient member are deformed is increased. As a result, sufficient damping forces will not be produced.

Figure 7:
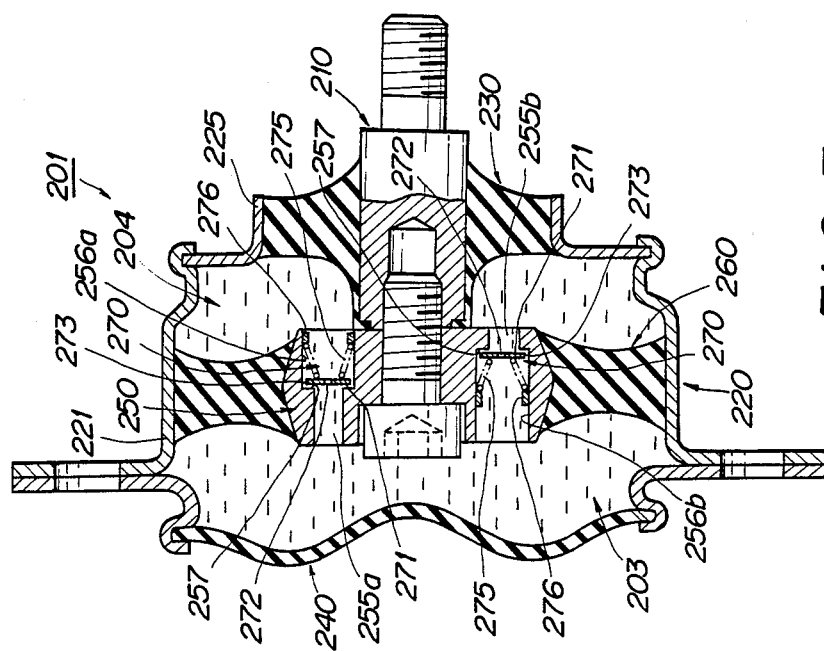
FIG. 7 is an axial cross-sectional view of a fluid-sealed mounting according to a second embodiment of the present invention.

According to the second embodiment, as shown in FIG. 7, a valve mechanism is disposed in each of orifices for varying the cross-sectional area of the fluid passage through the orifice.

Since the fundamental construction of the second embodiment is substantially the same as that of the mounting shown from FIG. 4, identical parts are denoted by identical two digit reference characters as added to 200 and will not be described in detail.

As shown in FIG. 7, a fluid-sealed mounting 201 has a weight 250 having a pair of diametrically opposite passages 255a, 255b extending axially therethrough. The passage 255a has a larger-diameter valve housing chamber 256a opening into a righthand fluid chamber 204, and the other passage 255b has a large-diameter valve housing chamber 256b opening into a lefthand fluid chamber 203. In each of the valve housing chambers 256a, 256b, there is disposed a valve mechanism 270 composed of a circular valve 271 and a coil spring 275.

The circular valve 271 has a central orifice 272 and radial recesses 273 defined in an outer peripheral edge thereof. The valve mechanism 270 is positioned in each of the valve housing chambers 256a, 256b of the passages 255a, 255b. The coil spring 275 is placed under compression between the rear surface of the circular valve 271 and a snap-ring-shaped spring seat 276 fitted in each of the valve housing chambers 256a, 256b for pressing the valve 271 against the valve seat 257. Under normal condition, the chambers 203, 204 are held in communication with each other through a central orifice 272 in the valve 271 for achieving the same advantages as those described with reference to the first embodiment.

The resilient force of the coil spring 275 is selected such that if the fluid pressure in one of the chambers in the mounting 201 quickly rises due to an impact load applied, the coil spring 275 allows the valve 271 to be retracted from the valve seat 257 upon such a quick pressure buildup in one of the chambers.

With the valve mechansim 270 composed of the circular valve 271 and the coil spring 275 and disposed in each of the two passages 255a, 255b, normal vibrations applied to the mounting 201 are dampened only by fluid flow through the central orifices 272 in the valves 271. When an impact load is imposed on the mounting 201, one of the valves 271 is retracted to permit the fluid to flow also through the recesses 273 in the outer peripheral edges of the valve 271. Therefore, the fluid flows at an increased rate through the passage 255a or 255b when an impact load is applied, thereby achiving sufficient damping.

In the arrangement of FIG. 7, the valve mechanism 270 is composed of the circular valve 271 and the coil spring 275, and the cross-sectional area of the fluid passage is varied in two steps. However, a valve mechansim 280 of a fluid-sealed mounting 201' according to a modification shown in FIG. 8 includes a partition valve 281 disposed centrally in an orifice 286 on a base 220' and controlled by a solenoid 282 for changing the cross-sectional area of the orifice 286. With this arrangement, the cross-sectional area of the orifice 286 can automatically be varied dependent on the speed and extend of displacement of the mounting 201'.

Generally, a fluid-sealed mounting is required to provide a small cross-sectional area of an orifice for sufficient damping to supress displacement when the mounting is subjected to small vibrations, to provide a large cross-sectional area of the orifice for reducing a spring constant and supressing the transfer of forces when the mounting suffers from a pulsating load, and to provide a small cross-sectional area of the orifice for increasing the spring constant and suppressing displacement immediately before the mounting reaches a maximum displacement.

Figure 8:
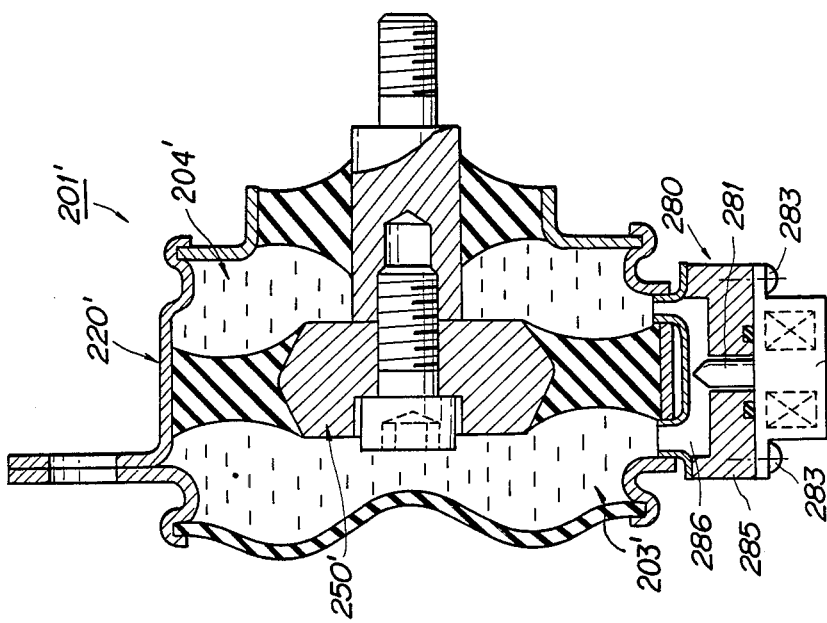
FIG. 8 is a view similar to FIG. 1, showing a modification of the second embodiment.

According to the modification shown in FIG. 8, no orifice is defined in a weight 250', and an orificedefining member 285 is secured to an outer peripheral surface of the base 220' and has the orifice 286 providing communication between chambers 203', 204'. The partition valve 281 is retractably disposed centrally in the orifice 286 and controlled for its projecting and retracting movement by the solenoid 282 fastened to the orificedefining member 285 by screws 283.

The speed and extent of displacement of the mounting 201' are detected by any known means, and the solenoid 282 is energized on the basis of detected data for controlling the partition valve 281.

Thus, the cross-sectional area of the orifice passage is controlled by the solenoid-operated valve, that is, the solenoid 282 energized on the basis of data such as the speed and extent of displacment of the mounting and the partition valve 281 controlled by the solenoid 282. With such an arrangement, the mounting is effective in dampening an impact load applied thereto and also in meeting various desired requriements as described above. Therefore, the mounting can produce ideal damping forces to cope with various conditions.

A third embodiment of the invention will now be described.

As described above with reference to the second embodiment, it is preferable that immediately before the fluid-sealed mounting reaches its maximum displacement, the spring constant be increased to suppress the displacement of the mounting, and if possible the rate of fluid flow through the orifice be forcibly inreased to produce strong damping forces.

Figure 9:
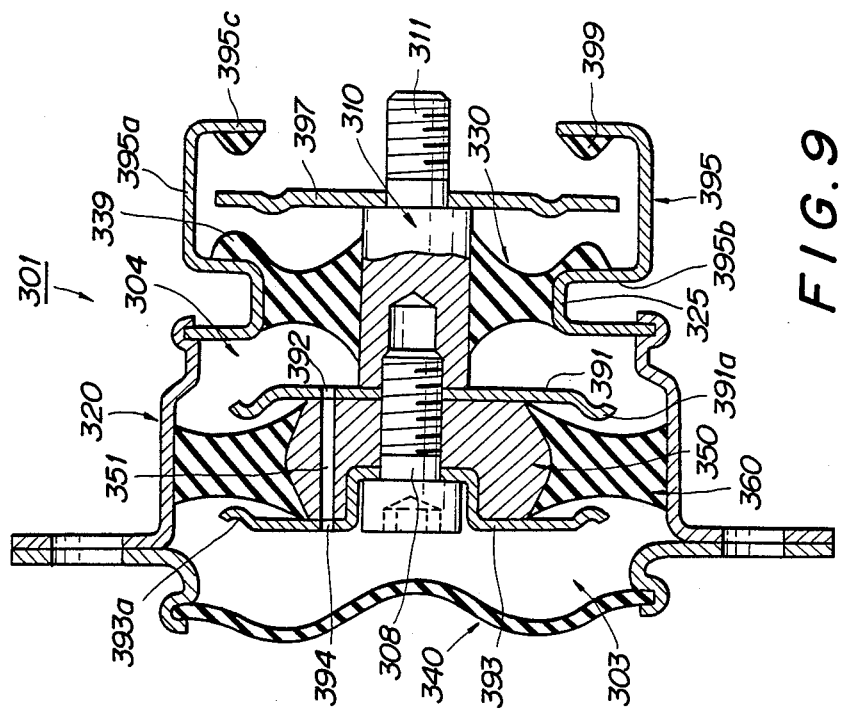
FIG. 9 is an axial cross-sectional view of a fluid-sealed mounting according to a third embodiment of the present invention.

According to the third embodiment, as illustrated in FIG. 9, a stopper is mounted on one end surface of at least one of elastic members for being pressed against the elastic member when the same is displaced beyond a certain extent.

Since the embodiment of FIG. 9 is substantially the same as that of the mounting shown from FIG. 4, identical parts are denoted by identical two-figure reference characters as added to 300 and will not be described in detail.

In the embodiment of FIG. 9, a circular stopper 391 is interposed between an attachment 310 and a weight 350 coupled by a bolt 308, and a circular stopper 393 is also interposed between the weight 350 and the head of the bolt 309. The two stoppers 391, 393 have orifices 392, 394 defined therethrough coaxially with an orifice 351 defined through the weight 350.

The stoppers 391, 393 are diposed respectively in fluid chambers 303, 304 and have outer peripheral edges curved into annular pushers 391a, 393a, respectively, projecting toward an intermediate portion of the elastic member 360 by which the fluid chambers 303, 304 are defined.

A base 320 has a smaller-diameter cylindrical portion 325 including a integral stopper barrel 395 composed of axially spaced annular plates 395b, 395c and a cylindrical portion 395a connecting outer peripheral edges of the annular plates 395b, 395c. An elastic member 330 which provides an end wall of the fluid hamber 304 has an integral annular ridge 339 secured by burning to an inner surface of the lefthand (as shown) annular plate 395b. An elastic annular ridge 399 is also secured by burning to an inner surface of the righthand annular plate 395c.

A circular stopper 397 is secured to an end of an attachment 310 by an attachment screw 311 and has an outer peripheral edge disposed initially intermediate between the elastic annular ridges 339, 399 on the stopper barrel 395.

Since the stoppers 391, 393 are secured to the attachment 310 in the fluid chambers 303, 304 in a mounting 301, the annular pusher of one of the stoppers 391, 393 is pressed against one end surface of the elastic member 360 in the fluid chamber and progressively deforms the elastic member 360 as any load on the mounting 301 tends to compress and tension the same, thereby increasing the spring constant. As the volume of one of the fluid chambers is forcibly reduced, the rate of flow of the fluid passing through the orifices 392, 351, 394 is forcibly increased to increase dampening forces. Therefore, the displacement of the mounting 301 can be suppressed prior to the maximum displacement thereof, and strong damping forces can be produced.

The stopper barrel 395 is securely attached to the base 320 and has the two elastic annular stopper ridges 339, 399 spaced axially or in the direction of displacment of the mounting 301, and the separate stopper 397 is securely mounted on the attachment 310. Therefore, immediately before the mounting 301 is displaced to a maximum extent, the stopper 397 is pressed against one of the stoppers 339, 399 to increase the spring constant and hence suppress the displacement of the mounting 301.

While in this embodiment the two stoppers are mounted on the attachment for pressing engagement with the elastic member in the fluid chamber, only one stopper is sufficient where the mounting displacement is to be suppressed in the direction of compression or tension only. The stopper may be mounted on the base or disposed out of the fluid chambers for pressing engagement with the outer elastic member.

Figure 10:
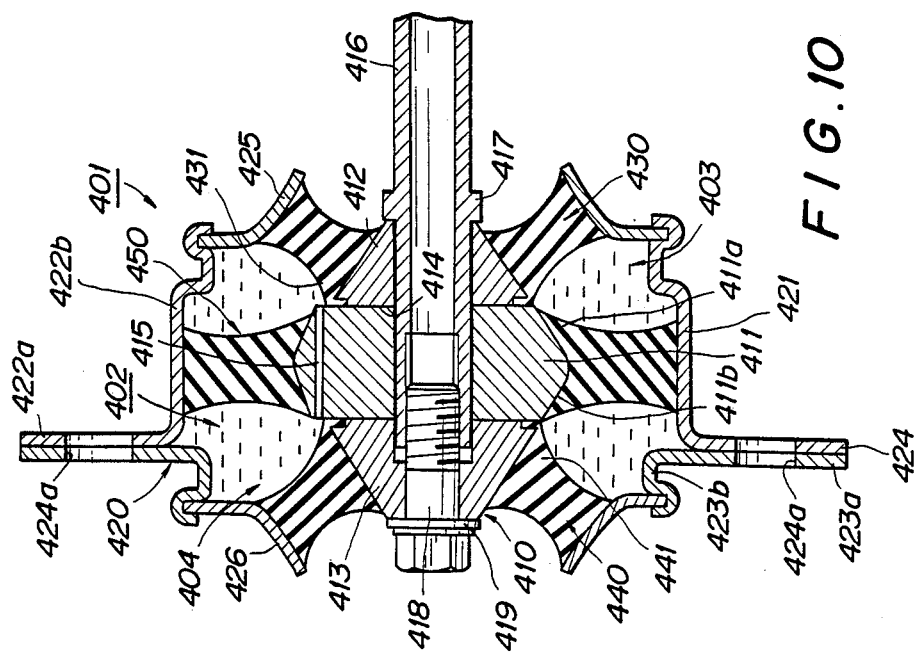
FIG. 10 is an axial cross-sectional view of a fluid-sealed mounting according to a fourth embodiment of the present invention.

FIG. 10 illustrates a fluid-sealed mounting 401 according to a fourth embodiment of the present invention. The fluid-sealing mounting 401 will hereinafter be described for use as a torque rod mounting or a radius rod mounting, but may also be used as an engine mounting.

An attachment 410 for connection to a source of vibrations such as a wheel axle comprises a thick circular plate having an intermediate body 411 having an outer peripheral surface shaped as two tapered portions 411a, 411b. Two frustoconical end bodies 412, 413 have bottom surfaces held against the opposite end surfaces of the intermediate body 411. The attachment 410 has a central through hole 414 defined in the bodies 411, 412, 413 and receiving an end of a hollow rod 416 such as a torque rod or a radius rod. The attachment 410 is assembled by a bolt 418 having a flange 419 and threadedly inserted through the end body 413 into the end of the hollow rod 416 inserted in the through hole 414.

The intermediate body 411 and the end bodies 412, 413 are securely assembled together by the flange 419 of the bolt 418 and a flange 417 formed on an outer peripheral surface of the rod 416 near its end. The intermediate body 411 has an orifice defined axially therethrough near the outer peripheral edge thereof and extending parallel to the rod 416.

The mounting 401 also includes a base 420 for being secured to a fixed member such as a vehicle body frame. The base 420 is composed of a first member having a cylindrical portion 422b extending axialy from an inner edge of a radial annular plate 422a and a second member having a cylindrical portion 423b extending axially from an inner edge of an annular plate 423b in a direction away from the cylindrical portion 422b. The annular plates 422a, 423a are superposed one on the other and secured as by welding. The base 420 is thus composed of a largediameter cylindrical body 412 comprising the cylindrical portions 422b, 423b. Annular tapered barrels 425, 426 have larger-diameter edges secured to the end of the cylindrical portions 422b, 423b, respectively, as by staking or welding.

Thick, annular shearing elastic members 430, 440 in the shape of an umbrella of rubber have outer peripheral surfaces secured by burning to inner peripheral surfaces of the annular tapered barrels 425, 426. The end bodies 412, 413 have outer peripheral surfaces secured by buring to inner peripheral surfaces of the elastic members 430, 440, thus defining a fluid chamber 402 in the mounting 401.

Another thick, annular shearing elastic member 450 of rubber having a larger diameter than that of the elastic members 430, 440 has an outer peripheral surface secured by burning to an inner peripheral surface of the cylindrical portion 422b of the large-diameter cylindrical body 421. The elastic member 450 has an inner peripheral surface secured by burning to the outer peripheral surface of the intermediate body 411 of the attachment 410. The elastic member 450 divides the fluid chamber 402 into two chambers 403, 404.

In the illustrated embodiment, the fluid-sealed mounting 401 thus constructed has a central axis extending horizontally with the attachment 410 and the base 420 disposed in concentric relation to each other.

A fluid (a liquid according to the illustrated embodiment) is sealed in the fluid chamber 402 divided by the elastic member 450 into the chambers 403, 404 and communicating with each other through the orifice defined through the attachment 410.

Since the fluid chamber 402 is divided into the two chambers 403, 404 by the elastic member 450 larger in diameter or cross-sectional are than the elastic members 430, 440 providing end walls of the fluid chamber 402 which is defined by the base 420 and the attachment 410, the elastic member 450 interconnecting the attachment 410 and the inner peripheral surface of the base 420. The three elastic members 430, 440, 450 will be displaced equally at the inner peripheral surfaces. The net rate $V_5$ of flow of the fluid from one of the chambers 404 to the other chamber 403 is substantially equal to the difference between the rate $V_4$ of flow of the fluid from the chamber 404 to the chamber 403 at the time the elastic member 450 in the fluid chamber 402 is vibrated in response to a vibratory load applied to the mounting 401 and the rate $V_3$ of flow of the fluid from the chamber 404 to the chamber 403 at the time the elastic member 440 serving as one end wall of the chamber 402 is vibrated. Such operation is illustrated in FIG. 11.

The rates $V_3$, $V_4$, $V_5$ of fluid flow are related as follows:

$$V_3\iota V_5 \neq V_4$$

Since the net rate of fluid flow is $(V_4-V_3)$ in the mounting of FIG. 10, the rate of fluid flow is reduced, and the fluid can forcibly be moved into the chambers 403, 404, cavitation can effectively be prevented from being generated in the orifice 415 even when the mounting 401 is subjected to a sudden tensile load. Therefore, the mounting 401 has a sufficient damping capability against compressive and tensile loads imposed thereon. Because there is no cylindrical connecting rod outside of the mounting 401, the mounting can be placed in a more advantageous layout, and can be used as an engine mounting as well as a torque rod mounting and a radius rod mounting.

Figure 12:
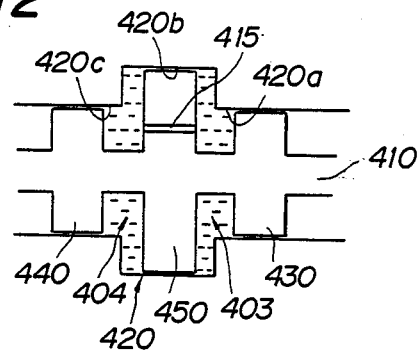
FIG. 12 is a cross-sectional view of a model of the fluid-sealed mountin of FIG. 10.

A structural model of the fluid-sealed mounting 401 is illustrated in FIG. 12. The base 420 serves as a cylinder having a larger-diameter intermediate sleeve 420b and smaller-diameter opposite sleeves 420a, 420c. The attachment 410 serves as a piston rod with the elastic members 430, 440 serving respectively as pistons mounted on the piston rod and slidable in the smaller-diameter sleeves 420a, 420c of the cylinder 420. The elastic member 450 serves an another piston disposed on an intermediate portion of the attachment 410 and slidable in the larger-diameter sleeve 420b of the cylinder 420. The two fluid chambers 403, 404 are defined by the piston 450 and held in communication by the orifice 415. The rate of fluid flow through the orifice 415 is controlled by the three pistons 430, 440, 450. The front and rear pistons 430, 440 have the same cross-sectional area.

The orifice 415 may be defined in the base 420 for achieving the same operation and advantages of the fluid-sealed mounting 401.

Figure 15:
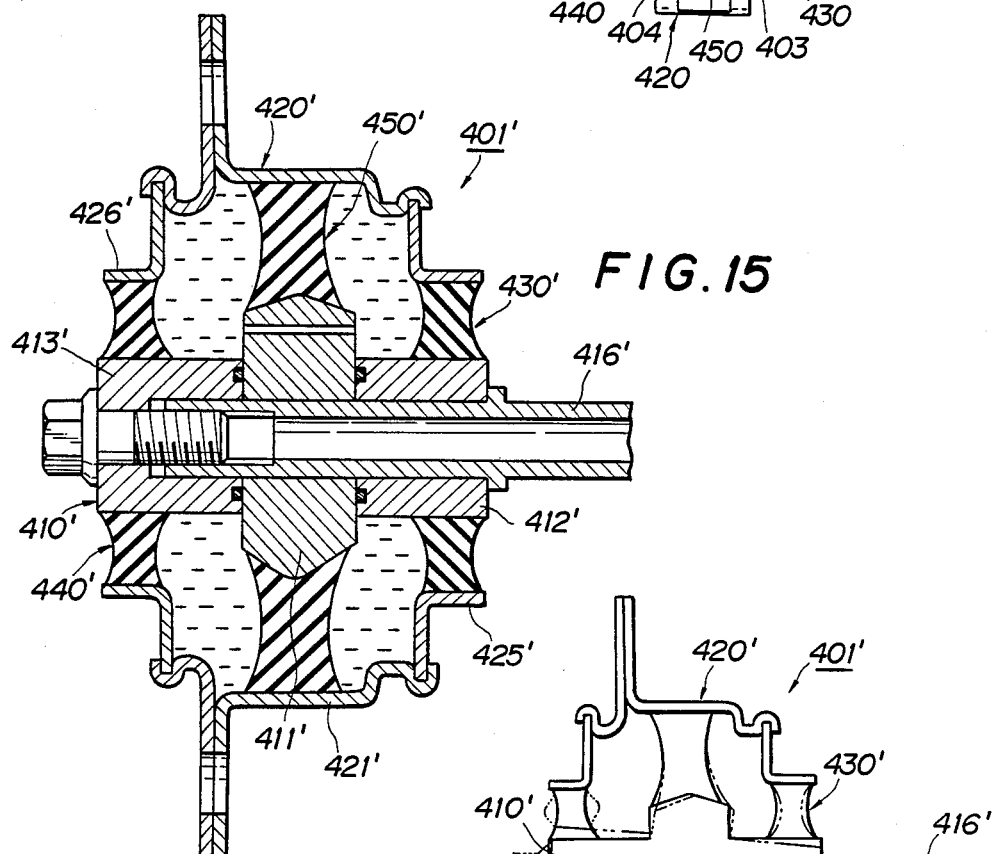
FIG. 15 is a view similar to FIG. 10, showing a basic construction of the fluid-sealed mounting according to the fourth embodiment.

Study of the model diagram of FIG. 12 indicates that a fundamental construction of the fluid-sealed mounting can be illustrated in FIG. 15. In FIG. 15, end bodies 412', 413' at ends of an attachment 410' are cylindrical in shape, and a base 420' has smaller-diameter cylindrical portions 425', 426' at ends thereof. The end bodies 412', 413' and the smaller-diameter cylindrical portions 425', 426' are connected by thin, annular elastic members 430', 440'. An intermediate body 411' of the attachment 410' and a larger-diameter cylindrical body 421' of the base 420' are connected by a larger-diameter thin, annular elastic member 450'. The fluid-sealed mounting 401' will operate in the same manner and has the same advantages as described above.

Figure 16:
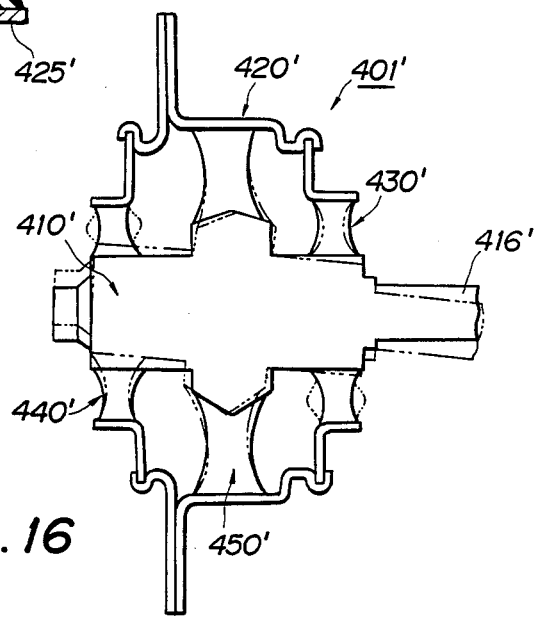
FIG. 16 is a diagram illustrative of a problem with the fluid-sealed mounting of FIG. 15.

If the fluid-sealed mounting 401' were used as a torque rod mounting or a radius rod mounting, there would be a limitation on flexible deformation of the elastic members 430', 440' following any bending or twisting movement of a rod 416', as shown in FIG. 16, because a spring constant of the mounting 401' perpendicular to the central axis thereof is high due to the elastic members 430', 440' being composed of simple annular plates.

In the embodiment of FIG. 10, the elastic members 430, 440 on opposite sides of the fluid chamber 402 are in the form of an umbrella and have inner peripheral surfaces 431, 441 inclined into the fluid chamber 402 with respect to the central axis of the mounting 401.

The mounting 401 thus constructed has a low spring constant or flexible resiliency in directions to bend and twist the attachment 410. Therefore, the bending and twisting movement of the rod 416 on the attachment 410 are allowed by flexible and smooth elastic deformation of the elastic members 430, 440 as shown in FIG. 13. The mounting 410 is consequently suitable for use as a torque rod mounting and a radius rod mounting.

The spring resiliency can be rendered flexible in bending and twisting directions simply by inclining only the inner peripheral surface of the elastic members with respect to the central axis of the mounting.

A fifth embodiment of the present invention will now be described. When an impact or shock load is imposed on the attachment 410 of the mounting 401 according to the fourth embodiment, the resistance to passage of the fluid moving through the orifice 415 is increased, and the rate at which the walls of the elastic members 430, 440 on opposite sides of the fluid chamber 402 and the elastic member 450 in the fluid chamber 402 are deformed is increased, with the result that sufficient damping will not be accomplished.

According to the fifth embodiment, a valve mechanism for varying the cross-sectional area of an orifice is incorporated in a fluid-sealed mounting.

Since the fundamental construction of the fifth embodiment is substantially the same as that of the mounting of the fourth embodiment shown from FIG. 10, identical parts are denoted by identical two digit reference characters as added to 500 and will not be described in detail.

As shown in FIG. 17, a fluid-sealed mounting 501 has an attachment 510 including an intermediate body 511 having a pair of diametrically opposite passages 561a, 561b extending axially therethrough. The passage 561a has a larger-diameter valve housing chamber 562a opening into a righthand fluid chamber 503, and the other passage 561b has a larger-diameter valve housing chamber 562b opening into a lefthand fluid chamber 504. In each of the valve housing chambers 562a, 562b, there is disposed a valve mechanism 570 composed of a circular valve 571 and a coil spring 575.

The circular valve 571 has a central orifice 572 and radial recesses 573 defined in an outer peripheral edge thereof as shown in FIG. 18. The detailed structure, operation, and advantages of the valve mechanism 570 are the same as those of the valve mechanism of the second embodiment shown in FIG. 7, and will not be described in detail.

FIG. 19 illustrates a modification of the fifth embodiment. No orifice is defined in an intermediate body 511' of an attachment 510', and an orifice-defining member 585 is secured to an outer peripheral surface of the base 520' and has an orifice 586 providing communication between chambers 503', 504'. A partition valve 581 is retractably disposed centrally in the orifice 586 and controlled for its projecting and retracting movement by a solenoid 582 fastened to the orifice-defining member 585 by screws 583. The partition valve 581 and the solenoid 582 jointly constitute a valve mechanism 580 for controlling the cross-sectional area of the passage through the orifice 586. The operation and advantages of the valve mechanism 580 are the same as those of the valve mechanism 280 shown in FIG. 8, and will not be repeated here.

A sixth embodiment of the present invention will be described. Since the fundamental construction of the sixth embodiment is substantially the same as that of the mounting of fourth embodiment shown from FIG. 10, identical parts are denoted by identical two digit reference characters as added to 600 and will not be described in detail.

Figure 20:
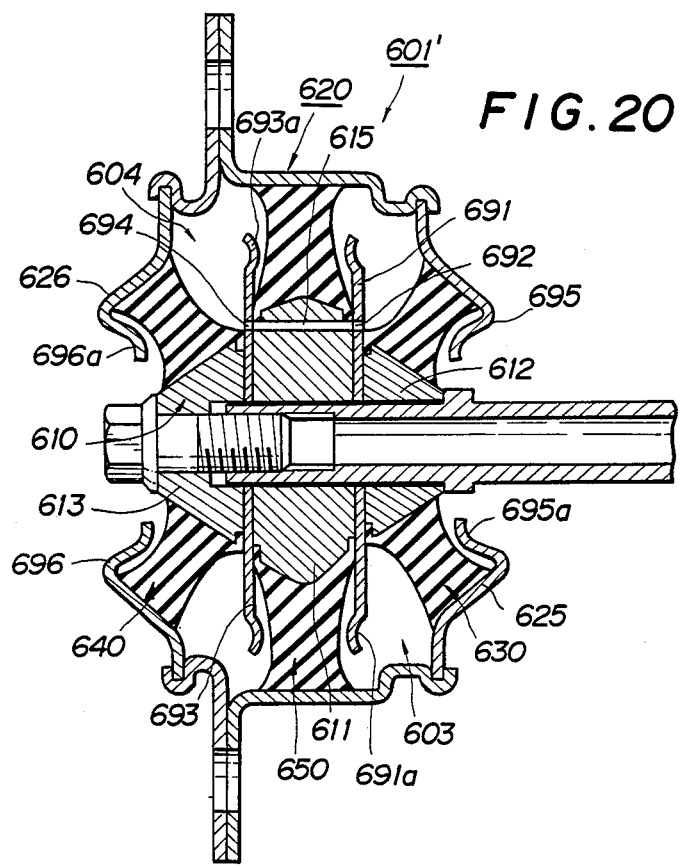
FIG. 20 is an axial cross-sectional view of a fluid-sealed mounting according to a sixth embodiment of the present invention.
Figure 21:
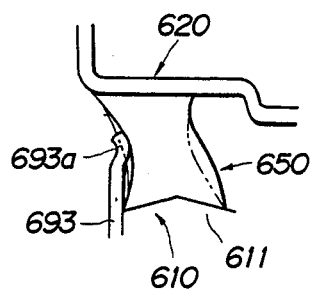
FIGS. 21 and 22 are views showing operation of the mounting of FIG. 20 with two different types of stoppers.

In the embodiment of FIG. 20, circular stopper 691, 693 are interposed between an intermediate body 611 and end bodies 612, 613 and have orifices 692, 694 defined therethrough coaxially with an orifice 615 defined through the intermediate body 611.

The stoppers 691, 693 are disposed on the attachment 610 respectively in fluid chambers 603, 604 and have outer peripheral edges curved into annular pushers 691a, 693a, respectively, projecting toward an intermediate portion of the elastic member 650 by which the fluid chambers 603, 604 are defined.

A base 620 has opposite annular tapered barrels 625, 626 including integral annular plate stoppers 695, 696, respectively, in open end thereof, the stoppers 695, 696 having inner peripheral edges projecting toward intermediate portions of outer surfaces of elastic members 630, 640 and serving respectively as curved annular pushers 695a, 696a.

Since the stoppers 691, 693 are secured to the attachment 610 in the fluid chambers 603, 604 in a mounting 601, the annular pusher 693a, for example, of one of the stoppers 691, 693 is pressed against one end surface of the elastic member 650 in the fluid chamber and progressively deforms the wall of the elastic member 650 as any load on the mounting 601 tends to compress and tension the same, thereby increasing the spring constant. As the volume of one of the fulid chambers 603 is forcibly reduced, the rate of flow of the fluid passing through the orifices 692, 651, 694 is forcibly increased to increase damping forces. Therefore, the displacement of the mounting 601 can be suppressed prior to the maximum displacement thereof, and strong damping forces can be produced.

Figure 22:
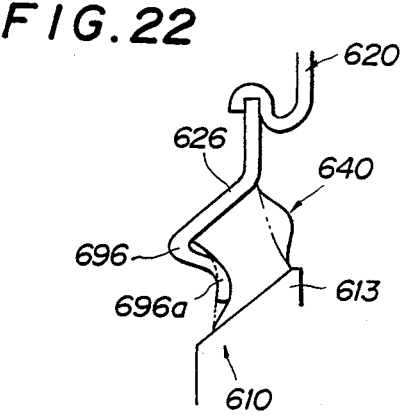

Since the stoppers 695, 696 are securely attached to the outer sides of the base 620, the annular pusher 696a, for example, of one of the stoppers 696 is pressed against the outer surface of the elastic member 640 at one end of the mounting 601 and progressively deforms the elastic member 640, as shown in FIG. 22, when the load on the mounting 601 is increased. As a consequence, combined with the action of the stopper 691, the spring constant is further increased and the damping forces are also increased, with the result that the deformation of the mounting 601 will be more suppressed for producing strnger damping forces.

For generating increased damping forces to damp one of compressive and tensile loads, only one stopper is sifficient, and for generating increased damping forces to dampen both compressive and tensile loads, two stoppers may be mounted on at least one of the attachment and the base.

Although in the above embodiments the fluid-sealed mounting has been described and illustrated as being horizontally positioned, it may be vertically arranged.

In the first through sixth embodiments, there are employed two or three elastic members and an attachment composed of two or three components, and they require an increased number of manufacturing steps and an increased cost of manufacture. A fluid-sealed mounting according to a seventh embodiment, which will be described below, is however much simpler in construction and hence less costly.

Figure 23:
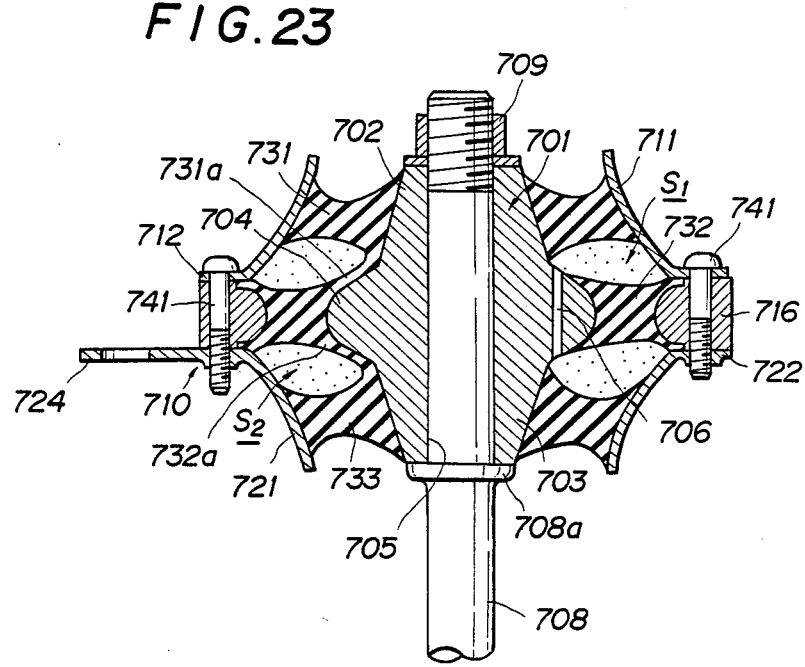
FIG. 23 is an axial cross-sectional view of a fluid-sealed mounting according to a seventh embodiment of the present invention.
Figure 24:
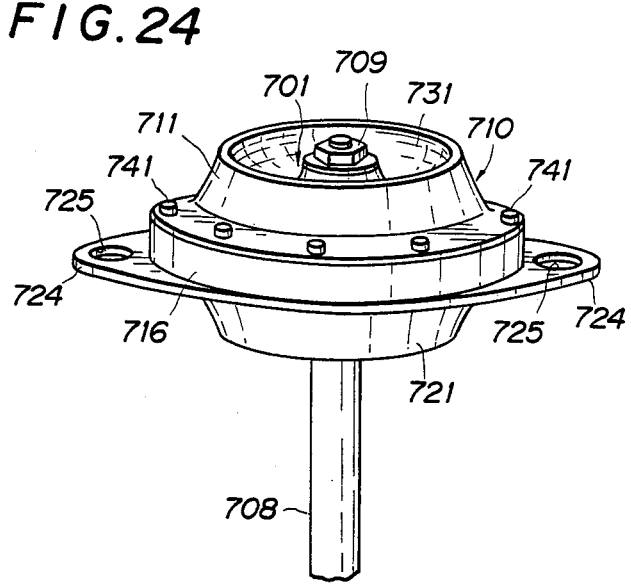
FIG. 24 is a perspective view of the fluid-sealed mounting shown in FIG. 23.

As shown in FIGS. 23 through 25, the mounting has an attachment 701 for connection to a source of vibrations such as a wheel axle, the attachment 701 being of an integral body having upper and lower (as shown) tapered portions 702, 703 and an intermediate larger-diameter portion 704. The attachment 701 has a central through hole 705 extending axially therethrough. The intermediate portion 704 has an axial orifice 706 defined axially through one side thereof.

A base 710 for being secured to a fixed member such as a vehicle body frame is composed of three separate components, that is, upper and lower (as shown) thin tapered cylindrical bodies 711, 721 sufficiently larger in diameter than the attachment 701 and an intermediate thick cylindrical body 716. The upper tapered cylindrical body 711 has a peripheral flange 712 on a lower larger-diameter end, and the lower tapered cylindrical body 721 has a peripheral flange 722 on an upper larger-diameter end. The upper peripheral flange 712 and the thick cylindrical body 716 have a plurality of screw insertion holes 713 and 717, respectively, and the lower peripheral flange 722 has a number of screw hole bosses 723 projecting downwardly. The lower peripheral flange 722 includes a pair of diametrically opposite attachment wings 724, 724 having attachment holes 725, 725, respectively.

For manufacturing the mounting, the single attachment 701 and the three-part base 701 are placed in a mold as shown in FIG. 25, and a mass of vulcanized rubber is filled between the attachment 701 and the base 710. The mold has rubber feed channels extending along the surface of the attachment 701 at positons corresponding to joint portions 731a, 732a between elastic members, so that elastic members 731, 732, 733 are continuously molded at the same time. More specifically, a body of rubber is secured by burning to and around the attachment 701 except upper and lower opening ends of the orifice 706 in the intermediate larger-diamter portion 702 of the attachment 701. The upper and lower tapered portions 702, 703 and the upper and lower tapered cylindrical bodies 711, 721 of the base 710 are joined by the upper and lower elastic members 731, 733, and the intermediate larger-diameter portion 704 and the thick cylindrical body 716 of the base 710 are joined by the intermediate elastic member 732.

The three elastic members 731, 732, 733 are simultaneously molded, and the peripheral flanges 712, 722 are fastened to the upper and lower ends of the thick cylindrical body 716 by fastening screws 741 to thereby assemble the base 710. With the base 710 thus assembled, the mounting has upper and lower fluid chambers S1, S2 divided by the intermediate elastic member 732. The intermediate elastic member 732 has a cross-sectional area greater than that of the upper and lower elastic members 731, 733.

A fluid is then sealed in the fluid chambers S1, S2 in the mounting, and the attachment wings 724, 724 of the base 710 are fixed to the vehicle body frame by fasteners through the attachment holes 725, 725. Thereafter, a rod 708 such as a torque rod or a radius rod connected to the vibration source is inserted into the through hole 705. A nut 709 is threaded over an exposed end of the rod 708 to fix the attachment 701 between a flange 708a of the rod 708 and the nut 709.

With the arrangement of the mounting according to the seventh embodiment, the three elastic members 731, 732, 733 can simultaneously be molded in a single molding process, and the base 710 can be assembled simply by fastening the three components 711, 716, 721 with the screws 741. Therefore, the manufacturing process is shortened, the manufactured mounting is simplified in construction and reduced in cost.

In the illustrated embodiment the base 710 is assembled with the screws 714. However, as shown in FIG. 26, a lower peripheral flange 722 may have a pin hole boss 726, a connector pin 742 may be inserted from above into the pin hole boss 726, and a wedge 743 on a distal end of the pin 742 may be engaged by the pin hole boss 726.

FIGS. 27 and 28 illustrates a modification of the seventh embodiment. The attachment 701 and the elastic members 731, 732, 733 are of the same construction as those of the seventh embodiment, but a base 760 has a different construction which will be described below.

The base 760 is composed of upper and lower tapered cylindrical bodies 761, 766 and an intermediate thin cylindrical body 771. As illustrated in FIG. 28, the upper and lower tapered cylindrical bodies 761, 766 has peripheral flanges 762, 767 having no holes. The intermediate thin cylindrical body 772 has upper and lower larger-diameter portions 772, 773 with an intermediate portion displaced radially inwardly as a recessed portion 774. The lower larger-diameter portion 773 has a pair of diametrically opposite connector wings 775 (only one shown) extending radially outwardly and having attachment holes 776, respectively.

In assembly, three elastic members 731', 732', 733' are simultantously molded, and the peripheral flanges 762, 767 are held against the inner sides of the upper and lower larger-diameter portions 772, 773 of the intermediate cylindrical body 771. Then, the larger-diameter portions 772, 773 are bent at 777, 778 so as to be staked on the peripheral flanges 762, 767 to assemble the base 760 as shown in FIG. 27. Attachment wings 768 of the lower tapered cylindrical body 766 and the connector wings 775 are fastened together.

Figure 29:
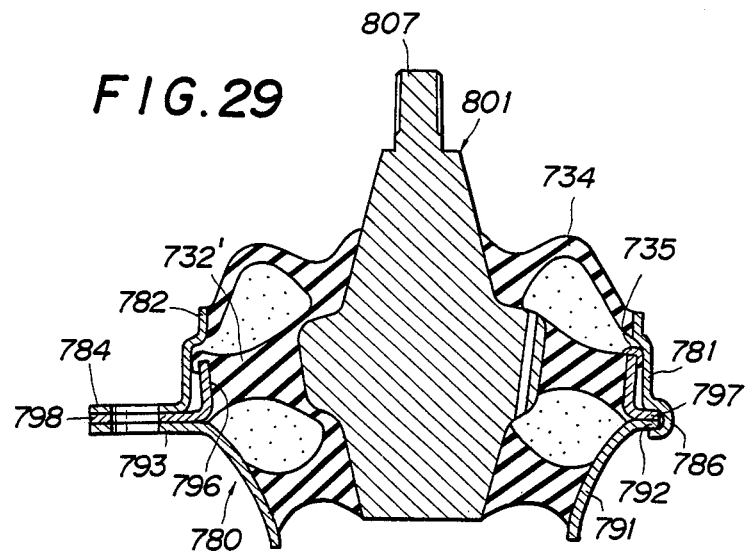
FIGS. 29 and 30 are views similar to FIGS. 23 and 25, showing aother modification.
Figure 30:
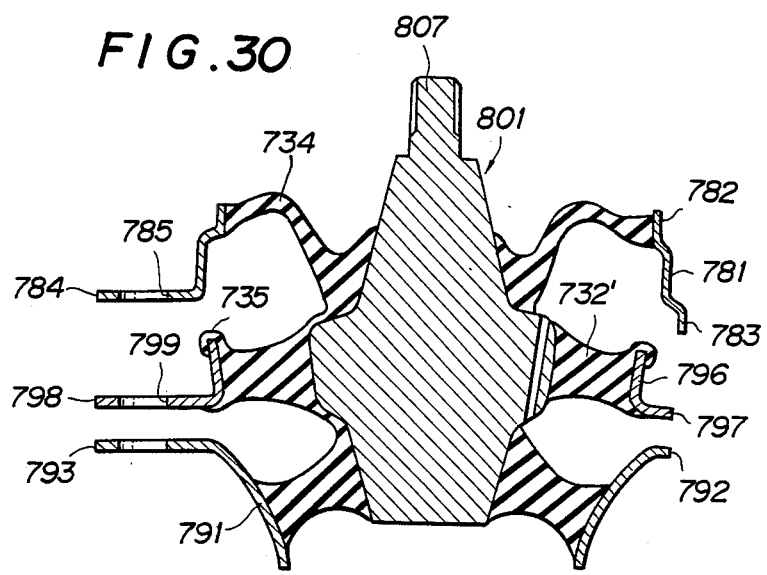

FIGS. 29 and 30 illustrate another modication of the seventh embodiment. The modification of FIGS. 29 and 30 differs from the seventh embodiment in that an attachment 801 has an attachment screw 807 projecting from an upper end thereof, an upper elastic member 734 is of a reduced thickness, and a base 780 is differently assembled.

The base 780 is composed of an upper thin cylindrical body 781, a lower tapered cylindrical body 791, and an intermediate thin cylindrical body 796. As illustrated in FIG. 30, the upper cylindrical body 781 has an upper smaller-diameter portion 782 to which the upper thin elastic member 784 is secured by burning. The upper cylindrical body 781 has a lower larger-diameter portion 783 slightly larger in diameter than the intermediate cylindrical body 796. The larger-diameter portion 783 of the upper cylindrical body 781 has a pair of diametrically opposite connector wings 784 (only one shown) projecting radially outwardly and having attachment holes 785. A body of rubber 735 contiguous to an intermediate elastic member 732' is secured by burning to an upper edge of the intermediate cylindrical body 796. The intermediate cylinderical body 796 has a lower peripheral flange 797 from which radially outwardly extends a pair of diametrically opposite connector wings 798 (only one shown) having attachment holes 799.

The peripheral flanges 792, 797 are held against an inner side of the larger-diameter portion 783 of the upper cylindrical body 781. As shown in FIG. 29, the larger-diamter portion 783 is staked at 786 on the peripheral flanges 792, 797 to thereby complete the base 780. The connector wings 784, 798 and attachment wings 793 of the lower tapered cylindrical body 791 are fastened together. An engine is connected to the attachment screw 807 projecting integrally from the attachment 801.

FIGS. 31 and 32 are illustrative of still another modification of the seventh embodiment. This modification has an attachment 801 which is the same as the attachment of the modification of FIGS. 29 and 30, but differs therefrom in that upper and lower elastic members 737, 736 are of a reduced thickness and a base 810 is differently assembled.

The base 810 is composed of an upper tapered cylindrical body 811, a lower thin cylindrical body 821, and an intermediate thin cylindrical body 816. As illustrated in FIG. 32, an upper thin elastic member 737 is secured by burning to the tapered cylindrical body 811. The tapered cylindrical body 811 has on a lower end a peripheral flange 812 having a pair of diametrically opposite connector wings 813 (only one shown) projecting radially outwardly. A body of rubber 738 contiguous to an intermediate elastic member 732' is secured by burning to a lower edge of the intermediate cylindrical body 816. The intermediate cylinderical body 816 has an upper peripheral flange 817 from which radially outwardly extends a pair of diametrically opposite connector wings 818 (only one shown). The lower cylindrical body 821 is slightly larger in diameter than the intermediate cylindrical body 816 and has a lower smaller-diameter portion 822 to which the lower thin elastic member 736 is secured by burning. The lower cylindrical body 821 also has an upper larger-diameter portion 823 from which a pair of diametrically opposite attachment wings 824 (only one shown) extends radially outwardly.

The peripheral flanges 812, 817 are held against an inner side of the larger-diameter portion 823 of the lower cylindrical body 821, and the larger-diameter portion 823 is staked at 825 on the peripheral flanges 812, 817 as shown in FIG. 31 to assemble the base 810. The connector wings 813, 818 are fastened together.

FIG. 33 is illustrative of a still further modification of the seventh embodiment. In this modification, a mounting has an upper half idential to that of the mounting according to the modification of FIGS. 31 and 32. An attachment 901 is composed of a lower largediameter portion 904 and an upper tapered portion 902, and a body of 739 of rubber is secured by burning to a lower surface of the attachment 902. A base 910 is composed of an upper cylindrical body 911, an intermediate cylindrical body 916, and a lower cover member 921. The attachment member 910 and the base 910 are coupled together by two elastic members 732', 737'.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

What is claimed is:

1. A liquid-sealed mounting comprising:
   (a) a base;
   (b) an attachment adapted to be connected to a source of vibrations;
   (c) a first elastic member connected to said base and to said attachment;
   (d) a liquid chamber defined at least partly by said base, said attachment, and said first elastic member, and filled with a liquid;
   (e) a partition including a second elastic member and dividing said liquid chamber into first and second chambers, said second elastic member being connected to said base and to said attachment, said partition and said first elastic member defining said first chamber, and a diaphragm connected to said base and cooperating with said partition to define said second chamber, displacement of liquid of said first chamber being effected by a first piston area composed of said first elatic member and a portion of said attachment connected thereto exposed to liquid in said first chamber and a second piston area composed of said second elastic member and a portion of said attachment connected thereto exposed to liquid in said first chamber; and
   (f) orifice means providing communication only between said first and second chambers;
   (g) said first and second piston areas each having a different area relative to each other for acting on the liquid in said first chamber to displace the liquid therein, said elastic members being deformable in response to relative displacment of said base and said attachment to effect displacement of a volume of liquid between said first and second chambers, through said orifice means, determined by the difference between said piston area acting upon liquid in at least said first chamber.

2. A liquid-sealed mounting according to claim 1, wherein said orifice means has valve means for controlling the rate of flow of the liquid through said orifice means.

3. A liquid-sealed mounting according to claim 1, wherein at least one of said base and said attachment has stopper means for being pressed against at least one of side surfaces of said first and secnd elastic members to supress the movement of said elastic members when said attachment is displaced beyond a certain extent.

4. A liquid-sealed mounting according to claim 1, wherein said first elastic member is coupled to said attachment at a surface inclined with respect to a central axis of said mounting.

5. A liquid-sealed mounting according to claim 1, wherein said attachment is composed of an integral component extending through said liquid chamber, and said base is composed of at least two separated components fastened together, said first and second elastic members being connected by a joint portion along a surface of said attachment.

6. A liquid-sealed mounting according to claim 1, wherein said orifice means comprises an orifice defining member secured to said attachment and a plurality of orifices defined in a peripheral wall of said orifice defining member.

7. A liquid-sealed mounting according to claim 1, wherein said orifice means comprises an orifice defining member secured to said attachment and diametrically opposite passages extending axially through said orifice defining member.

8. A liquid-sealed mounting according to claim 7, wherein valve means are incorporated in said diametrically opposite passages to control the rate of flow of said liquid through said passages, said valve means each including in combination a valve member and a coil spring, one valve means being disposed in one of said passages and a second valve means being disposed in the other passage.

9. A liquid-sealed mounting according to claim 8, wherein each of said valve members is of a circular shape, and each orifice means has a central orifice passage and a radial recess defined at the peripheral edge thereof.

10. A liquid-sealed mounting according to claim 2, wherein said valve means are solenoid actuated.

11. A liquid-sealed mounting comprising:
    (a) a base;
    (b) an attachment adapted to be connected to a source of vibrations;
    (c) a first elastic member connected directly to said base and to said attachment;
    (d) a second elastic member connected directly to said base and to said attachment;
    (e) a liquid chamber defined at least partly by said base, said attachment, and said first and second elastic members, and filled with liquid;
    (f) a partition including a third elastic member and dividing said liquid chamber into first and second chambers, said partition and said first elastic member defining said first chamber and said partition and said second elastic member defining said second chamber and to said attachment, displacement of liquid between said chambers being effected by a first piston area composed of said first elastic member and a portion of said attachment connected thereto exposed to said liquid in said first chamber, a second piston area composed to said second elastic member and a portion of said attachment connected thereto exposed to said liquid in said second chamber, and third piston areas composed of said third elastic member and portions of said attachment connected thereto exposed to liquid in each of said chambers; and
    (g) orifice means providing a communication only between said first and second chambers;
    (h) said first, second and third elastic members being deformable in response to relative displacement of said base and said attachment, at least two of said first, second and third piston areas in each chamber having different areas relative to each other for acting on the liquid in at least one of said first and second chambers to displace the liquid therein such that relative displacement of said base and said attachment will effect displacement of a volume of liquid between said first and second chambers, through said orifice means, determined by the differences in piston area acting upon liquid in each of said chambers.

12. A liquid-sealed mounting according to claim 11, wherein at least one of said base and said attachment has stopper means for being pressed against at least one of side surfaces of said first, second, and third elastic members to suppress the movment of said elastic members when said attachment is displaced beyond a certain extent.

13. A liquid-sealed mounting according to claim 11, wherein said third elastic member is coupled to said attachment at a surface inclined with respect to a central axis of said mounting.

14. A liquid-sealed mounting according to claim 11, wherein said attachment is composed of an integral component extending through said liquid chamber, and said base is composed of at least two separated components fastened together, said first, second, and third elastic members being connected by joint portions along a surface of said attachment.

15. A liquid-sealed mounting according to claim 11, wherein said orifice means has valve means for controlling the rate of flow of said liquid through said orifice.

16. A liquid-sealed mounting according to claim 11, wherein said first elastic member is coupled to said attachment at a surface inclined with respect to a central axis of said mounting.

17. A liquid-sealed mounting according to claim 11, wherein said source of said of vibrations is a radius rod connected with said attachment.

* * * * *